United States Patent
Hammarstrom et al.

(10) Patent No.: US 7,036,141 B1
(45) Date of Patent: Apr. 25, 2006

(54) TRANSMISSION SYSTEM, A METHOD AND AN APPARATUS PROVIDING ACCESS FOR IP DATA PACKETS TO A FIREWALL PROTECTED NETWORK

(75) Inventors: Martin Hammarstrom, Jonkoping (SE); Thomas Sparr, Nassjo (SE)

(73) Assignee: Teliasonera AB, Earsta (SE)

( * ) Notice: Subject to any disclaimer, the term of this patent is extended or adjusted under 35 U.S.C. 154(b) by 0 days.

(21) Appl. No.: 09/786,744

(22) PCT Filed: Sep. 8, 1999

(86) PCT No.: PCT/SE99/01561

§ 371 (c)(1),
(2), (4) Date: Aug. 20, 2001

(87) PCT Pub. No.: WO00/16530

PCT Pub. Date: Mar. 23, 2000

(30) Foreign Application Priority Data

Sep. 11, 1998 (SE) .................................... 9803125

(51) Int. Cl.
*H04L 9/32* (2006.01)
*H04L 9/00* (2006.01)

(52) U.S. Cl. ............................ 726/11; 726/12; 726/13; 709/225; 709/227; 709/229

(58) Field of Classification Search ................ 713/201, 713/200; 709/225, 227, 229
See application file for complete search history.

(56) References Cited

U.S. PATENT DOCUMENTS

| | | | |
|---|---|---|---|
| 5,778,174 A | * | 7/1998 | Cain ........................... 713/201 |
| 5,793,763 A | * | 8/1998 | Mayes et al. ............... 370/389 |
| 5,826,029 A | | 10/1998 | Gore, Jr. et al. |
| 5,828,833 A | | 10/1998 | Belville et al. |
| 5,909,549 A | * | 6/1999 | Compliment et al. ....... 709/223 |
| 6,104,716 A | * | 8/2000 | Crichton et al. ............ 370/401 |

FOREIGN PATENT DOCUMENTS

| | | |
|---|---|---|
| EP | 0 713 311 | 5/1996 |
| EP | 0 743 777 | 11/1996 |
| EP | 0 909 075 | 4/1999 |
| WO | WO 97/00471 | 1/1997 |
| WO | WO 98/31124 | 7/1998 |

OTHER PUBLICATIONS

CERT Advisory CA-1996-26 Denial-of-Service Attack via Ping; Dec. 16, 1996; http://www.cert.org/advisories/CA-1996-26.html.*
Leech et al; RFC 1928 "SOCKS Protocol Version 5"; Mar. 1996.*
Lee, Ying-Da; "SOCKS: A protocol for TCP proxy across firewalls"; http://archive.socks.permeo.com/protocol/socks4.protocol.*
Halsall; Data Communications, Computer Networks and Open Systems; 1996; Addison-Wesley Publishers Ltd.; Chapter 10.*

* cited by examiner

*Primary Examiner*—Gilberto Barrón, Jr.
*Assistant Examiner*—Jung Kim
(74) *Attorney, Agent, or Firm*—Oblon, Spivak, McClelland, Maier & Neustadt, P.C.

(57) ABSTRACT

The invention provides a transmission system, for example, an ATM transmission system, which is adapted for the transmission of IP data packets, and which includes an IP-network, a network protected by a firewall, and means for temporarily opening the firewall to enable IP data packets to be transmitted through the firewall to the protected network. The firewall operates in a manner whereby a particular type of IP-packet, i.e. a Ping (ICMP)-packet, is allowed to pass through the firewall, IP-traffic can pass through the firewall from the inside thereof to the outside thereof, and IP-traffic, similar to that which is sent from the inside of the firewall to the outside of the firewall, can be transmitted through the firewall to the protected network for a limited period of time. In particular, the firewall opening means include two IC-breakers, which are located on opposite sides of said firewall, and which have a structure and functionality dictated by the manner in which the firewall operates. In other words, when an IP data packet, destined for the protected networks, is received by the IC-breaker located on the outside of the firewall, the IC-breakers are adapted to communicate with each other to create the temporary opening in the firewall via which the IP data packet is sent to the protected network.

23 Claims, 1 Drawing Sheet

Figure 1:
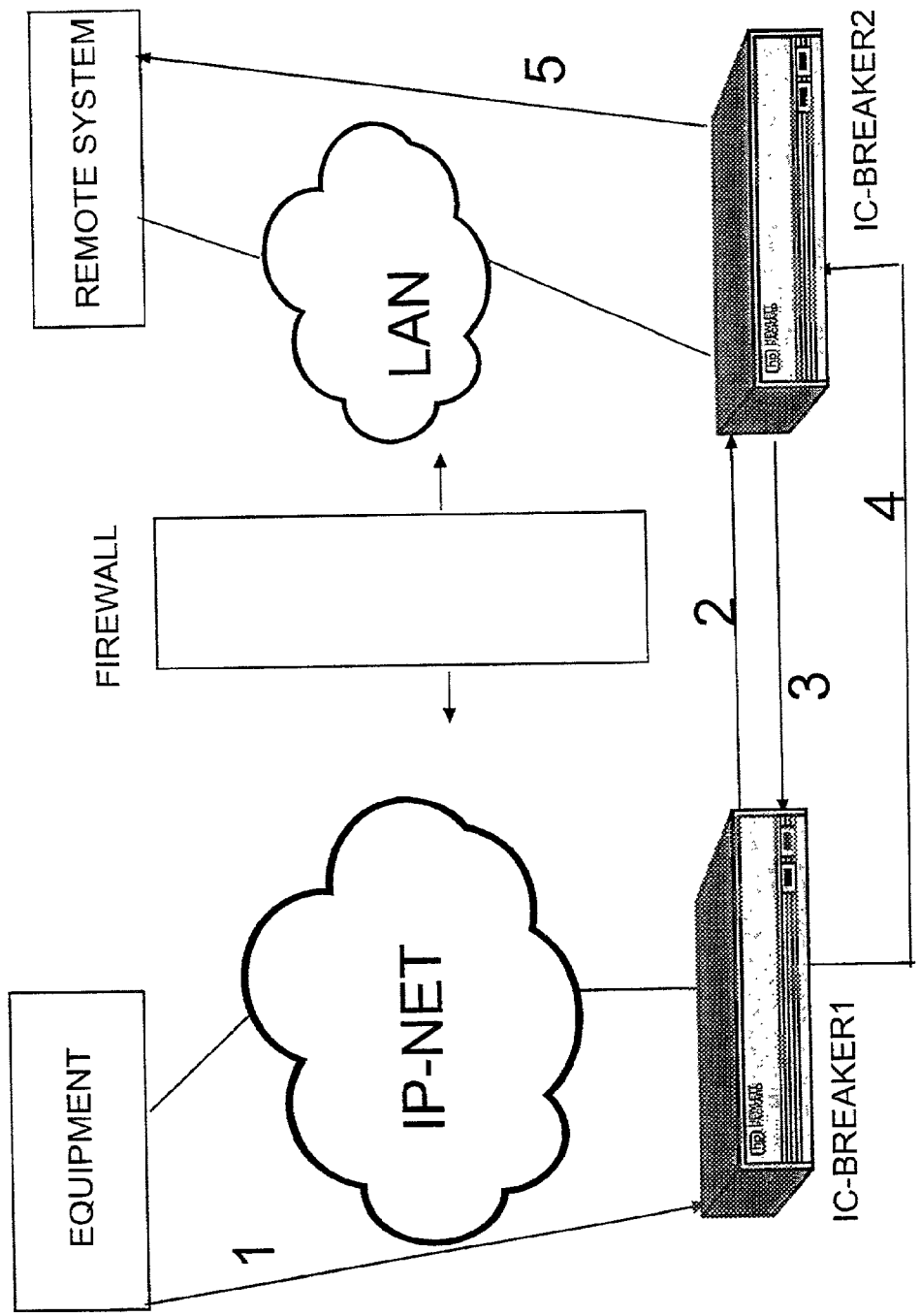

TRANSMISSION SYSTEM, A METHOD AND AN APPARATUS PROVIDING ACCESS FOR IP DATA PACKETS TO A FIREWALL PROTECTED NETWORK

The invention relates to transmission systems which are adapted for the transmission of IP (Internet Protocol) data packets through a firewall, the system including means adapted to temporarily open the firewall to enable IP data packets to be transmitted therethrough, a method for the transmission of IP data packets to a system inside a firewall, apparatus for providing access to a firewall protected network, and a communications system including the transmission system of the present invention, or operating in accordance with the method of the present invention.

It is known to use a firewall and other equipment to block incoming traffic, such as, IP (Internet Protocol) data packets, but the problem with a firewall and other equipment designed to block incoming data packets, is that it can be very difficult to remotely control systems which are inside the firewall.

When an attempt is made by a computer to contact another computer, difficulties are sometimes experienced in obtaining a reply from the computer. In these circumstances, it is possible to use a Ping service to determine whether, or not, the computer is connected to the network. In operation, the Ping service sends a message, in the form of a data packet, to the computer, with which contact is required, and when the computer receives the data packet it sends it back to the sender. If the data packet is not returned, then the sender will be aware that the computer is not connected to the network. In Windows, the Ping service can be run from DOS.

It is an object of the present invention to provide a transmission system, adapted for the transmission of IP (Internet Protocol) data packets through a firewall, the system including means adapted to temporarily open the firewall to enable IP data packets to be transmitted therethrough. The firewall opening means are provided by two IC-breakers, one of which is located on one side of the firewall and the other one of which is located on the other side of the firewall. An IC-breaker is a function that can be either included in an application, or be a separate entity.

It is another object of the present invention to provide a method for the transmission of IP data packets to a system inside a firewall.

It is another object of the present invention to provide apparatus for providing access to a firewall protected network and a transmission system including such an apparatus.

It is another object of the present invention to provide IC-breakers adapted for use with apparatus of the present invention.

It is another object of the present invention to provide a communications system including the transmission system of the present invention, or operating in accordance with the method of the present invention.

According to a first aspect of the present invention, there is provided, a transmission system, adapted for the transmission of IP data packets, said system including an IP-network and a network protected by a firewall, said firewall being adapted to block incoming traffic to the protected network, characterised in that said system further includes means for temporarily opening the firewall to enable IP data packets to be transmitted through the firewall to the protected network.

The firewall may be adapted to be transparent to Ping (Internet control message protocol ICMP)-packets; IP-traffic passing through the firewall from the inside thereof to the outside thereof; and, for a limited period of time, IP-traffic, similar to that which is sent from the inside of the firewall to the outside of the firewall, passing through the firewall from the outside thereof to the inside thereof.

The means for temporarily opening the firewall may include first and second IC-breakers, located on opposite sides of said firewall, and said IC-breakers may have a structure and functionality dictated by the manner in which said firewall is adapted to operate.

The first IC-breaker may be adapted, on receipt of an IP data packet, to store said IP data packet; send a Ping IP-packet to the second IC-breaker through the firewall; await receipt of a returned Ping IP-packet from the second IC-breaker, said IP-packet opening the firewall for a short period of time; and send said stored IP data packet through the open firewall to the second IC-breaker.

The second IC-breaker may be adapted to identify the size of a Ping IP-packet received from a sender located outside of the firewall, said size being indicative of the type of packet which has been received and the port via which it was received; return the Ping IP-packet to the sender, which opens the firewall for a limited period of time; await receipt, from the sender, of an IP data packet for the protected network, during said limited period of time said firewall is open; and send the received IP data packet to the protected network.

The first IC-breaker may be located on the IP-network side of the firewall, in which case, said second IC-breaker is located on the protected network side of the firewall. The first IC-breaker may be adapted to receive IP data packets from IP-network equipments that are destined for the protected network. The IC-breakers may be adapted, on receipt, by said first IC-breaker, of a IP data packet for the protected network, to communicate with each other, through the firewall, using Ping (ICMP)-packets, a Ping-packet returned by said second IC-breaker to said first IC-breaker temporarily opening the firewall for this type of traffic, and said first IC-breaker may be adapted, on receipt of the returned Ping-packet, to send the IP data packet through the opened firewall to the second IC-breaker. The second IC-breaker may be adapted, on receipt of said IP data packet, to send the received packet to the protected network.

According to a second aspect of the present invention, there is provided, a transmission system, adapted for the transmission of IP data packets, said system including an IP-network and a network protected by a firewall, characterised in that said firewall is adapted to allow a particular type IP-packet to pass through the firewall to the protected network; IP-traffic to pass through the firewall from the inside thereof to the outside thereof, said IP-traffic opening the firewall for IP-traffic for a limited period of time; and IP-traffic, similar to that which is sent from the inside of the firewall to the outside of the firewall, to be transmitted through the firewall to the protected network during said limited period of time. The particular type of IP-packet may be a Ping (ICMP)-packet.

The protected network may be a Local Area Network (LAN) and the transmission system may be an Asynchronous Transfer Mode (ATM) transmission system, adapted for the transmission of IP data packets, using ATM as a carrier network.

According to a third aspect of the present invention, there is provided, in a transmission system, adapted for the transmission of IP data packets, said system including an IP-Network and a network protected by a firewall, a method for the transmission of IP data packets to the protected network, characterised by opening said firewall for a limited period of time and by transmitting an IP data packet, through the opened firewall, to the protected network.

The method may be characterised by said firewall allowing a particular type of IP-packet to pass through; and IP-traffic to pass through, from the inside thereof to the outside thereof, said IP-traffic opening the firewall for said limited period of time; and by transmitting said IP data packet to said protected network during said limited period of time, said IP data packet being similar to the IP-traffic which opens the firewall for said limited period of time. The method may be further characterised by said particular type of IP-packet being a Ping (ICMP)-packet.

The method may be characterised by said system including first and second IC-breakers, located on opposite sides of said firewall, and by said IC-breakers having a structure and functionality dictated by the manner in which said firewall operates. The method may be further characterised by said first IC-breaker being located on the outside of the firewall and said second IC-breaker being located on the inside of the firewall, and by said first IC-breaker receiving and storing IP data packets for the protected network; on receipt of said IP data packet, sending Ping IP-packets to the second IC-breaker through the firewall; awaiting receipt of a return Ping IP-packet from the second IC-breaker, said IP-packet opening the firewall for a short period of time; and sending said stored IP data packet through the open firewall to the second IC-breaker. The method may be further characterised by said second IC-breaker identifying the size of a Ping IP-packet received from said first IC-breaker, said size being indicative of the type of packet which has been received and the port via which it was received; returning the Ping IP-packet to said first IC-breaker, thereby opening the firewall for a limited period of time; awaiting receipt, from said first IC-breaker, of said IP data packet for the protected network, during said limited period of time said firewall is open; and sending the received IP data packet to the protected network.

The method may be characterised by said first IC-breaker being located on the IP-network side of the firewall and said second IC-breaker being located on the protected network side of the firewall; said first IC-breaker receiving and storing IP data packets from IP-network equipments that are destined for the protected network; said IC-breakers on receipt, by said first IC-breaker, of a IP data packet for a protected network, communicating with each other, through the firewall, using Ping (ICMP)-packets, a Ping-packet returned by said second IC-breaker to said first IC-breaker temporarily opening the firewall for this type of traffic; said first IC-breaker, on receipt of the returned Ping-packet, sending the IP data packet through the opened firewall to the second IC-breaker; and said second IC-breaker, on receipt of said IP data packet, sending the received packet to the protected network.

The method may be characterised in that said protected network is a Local Area Network (LAN).

The method may be characterised in that said system is an Asynchronous Transfer Mode (ATM) transmission system, adapted for the transmission of IP data packets, using ATM as a carrier network.

According to a fourth aspect of the present invention, there is provided, apparatus for providing access to a firewall protected network, characterised in that said arrangement includes means for temporarily opening the firewall to enable IP data packets to be transmitted through the firewall to said protected network. The means for temporarily opening the firewall may include two IC-breakers, located on opposite sides of said firewall, and said firewall may be adapted to allow IP-traffic to be transmitted from the inside thereof to the outside thereof, and communication between said IC-breakers using a Ping service, a response to said Ping service temporarily opening the firewall for the transmission of IP data packets to said protected network.

The IC-breaker, located on the outside of said firewall, may be adapted to store IP data packets destined for the protected network; send Ping IP-packets to the other IC-breaker through the firewall; await receipt of a returned Ping IP-packet from said other IC-breaker, said IP-packet opening the firewall for a limited period of time; and send said stored IP data packet through the open firewall to said other IC-breaker.

The IC-breaker, located on the protected network side of the firewall may be adapted to identify the size of a Ping IP-packet received from a sender located outside the firewall, said size being indicative of the type of packet which has been received and the port via which it was received; return the Ping IP-packet to the sender, which opens the firewall for a limited period of time: await receipt, from the sender, of an IP data packet for the protected network, during said limited period of time said firewall is open; and send the received IP data packet to the protected network.

A first one of said IC-breakers may be located on the outside of the firewall and a second one of said IC-breaker is located on the protected network side of the firewall, said first IC-breaker may be adapted to receive and store IP data packets destined for the protected network, said IC-breakers may be adapted, on receipt, by said first IC-breaker, of a IP data packet for the protected network, to communicate with each other, through the firewall, using Ping (ICMP)-packets, a Ping-packet returned by said second IC-breaker to said first IC-breaker temporarily opening the firewall for this type of traffic, said first IC-breaker may be adapted, on receipt of the returned Ping-packet, to send the IP data packet through the opened firewall to the second IC-breaker, and said second IC-breaker may be adapted, on receipt of said IP data packet, to send the received packet to the protected network.

According to a fifth aspect of the present invention, there is provided, an IC-breaker adapted for use with apparatus as outlined in preceding paragraphs, characterised in that said IC breaker includes means for transmitting PING packets to an IC breaker located behind a firewall, means for storing a received IP packet, means for detecting receipt of an IP packet from within said firewall, and means, operative in response to receipt of an IP packet from within said firewall, to transmit IP stored packets.

According to a sixth aspect of the present invention, there is provided, an IC-breaker adapted for use with apparatus as outlined in preceding paragraphs, characterised in that said IC-breaker includes means for identifying a received PING packet and determining an associated IP packet type therefrom, means for transmitting an IP packet of the type associated with the received IP packet through the firewall, means for receiving an IP packet transmitted through said firewall, and means for distributing said IP packet to a predetermined address.

According to a seventh aspect of the present invention, there is provided, a transmission system, adapted for the transmission of IP data packets, said system including an IP-network and a network protected by a firewall, characterised in that said system includes an apparatus as outlined in preceding paragraphs.

According to an eighth aspect of the present invention, there is provided, a communications system including a transmission system, as outlined in preceding paragraphs, or operating in accordance with a method, as outlined in preceding paragraphs.

The foregoing and other features of the present invention will be better understood from the following description with reference to the single FIGURE of the accompanying drawings which diagrammatically illustrates a transmission system according to the present invention.

The single FIGURE of the accompanying drawings diagrammatically illustrates an example of how a SNMP (Switching Network Management Protocol)-TRAP can be distributed to a remote system which is inside a firewall. TRAP is an SNMP operation. In practice, the IP-plane control entity, on recognizing an IP data flow, may be adapted to generate a SNMP-TRAP with information about the recognized IP data flow and its attributes. An SNMP-TRAP may be used to issue an unconfirmed notification to downstream/upstream nodes of an ATM carrier network and SNMP SET/RESPONSE may be used when confirmation is sought by the transmission system.

As is diagrammatically illustrated in the single FIGURE of the accompanying drawings, a firewall, which is interposed between an IP-Network and a firewall protected network, for example, a Local Area Network (LAN), is adapted to normally block incoming traffic, from an Equipment connected to the IP-Network, to a Remote System connected to a firewall protected network. The IP-Network includes an IC-breaker 1, which is adapted to receive and store an IP data packet from the IP-Network Equipment and to communicate, in a manner to be subsequently outlined, with an IC-breaker 2. The IC-breaker 2 is adapted to send IP data packets, received from IC-breaker 1, to the Remote System connected to the LAN.

The problem with a firewall and other equipment is that it can be very difficult to remotely control systems which are inside the firewall, i.e. the Remote System. An IC-breaker which is adapted to temporarily open the firewall for a special type of traffic, is a functionality that can be either included in an application, or in a separate entity. The transmission system of the present invention includes two IC-breakers, one of which is inside the firewall and the other one of which is outside the firewall.

As is diagrammatically illustrated in the single FIGURE of the accompanying drawings, the distribution of traffic from an equipment outside the firewall to a network user inside the firewall is effected through use of IC-breaker 1 in association with IC-breaker 2. In particular, an IP data packet required to be transmitted from the IP-Network Equipment to the Remote System, is sent by the IP-Network Equipment to the IC-breaker 1. The received IP data packet is stored in the IC-breaker 1. The stored IP data packet is then sent by IC-breaker 1 to IC-breaker 2, which is situated inside the firewall, in a manner according to the present invention. On receipt of the IP data packet, IC-breaker 2 sends it to the Remote System.

The IC-breakers have a structure and functionality based on the following properties of the firewall:

- a 'PING' (Internet Control Message Protocol (ICMP)) packets can always be sent through a firewall;
- IP-traffic can always be transmitted from the inside of a firewall to the outside of the firewall; and
- if IP-traffic is sent from the inside of a firewall to the outside of the firewall, similar IP-traffic can be transmitted to the network protected by the firewall during a limited period of time.

As stated above, the Ping service which, in Windows, can be run on DOS, enables a network equipment to sends messages, in the form of data packets, to a computer with which contact is required. If the computer is connected to the network, the computer, on receipt of a Ping packet, sends it back to the network equipment. If the data packet is not returned, the network equipment will know that the computer is not connected to the network.

A method, according to the present invention, for the distribution of a SNMP-TRAP to a network inside a firewall, i.e. the Remote System of the LAN, will now be described with reference to the single FIGURE of the accompanying drawings. The steps of this method, which are illustrated in the single FIGURE of the drawings by the lines numbered 1 to 5, are as follows:

- the IP-Network Equipment sends an IP data packet to IC-breaker 1, as shown by line 1, the data packet being stored in IC-breaker 1;
- on receipt and storage of the IP data packet, IC-breaker 1 sends a series of Ping (ICMP) packets (messages) to IC-breaker 2 (see line 2)—Ping (ICMP) packets can always be sent through a firewall;
- on receipt of the Ping (ICMP) packets, IC-breaker 2 sends an IP data packet back to IC-breaker 2 (see line 3), which opens the firewall temporarily for this kind of traffic—IP-traffic can always be transmitted from the inside of a firewall to the outside of the firewall;
- IC-breaker 1 sends the IP data packet, for the Remote System of the LAN, through the opened firewall to IC-breaker 2 (see line 4); and
- on receipt of the IP data packet, IC-breaker 2 sends the IP data packets to the Remote System of the LAN, as shown by line 5.

It will be seen from the foregoing description that, in accordance with the present invention an arrangement and method is provided for gaining access to a firewall protected network, i.e. the Remote System of the LAN, and that means are provided for temporarily opening the firewall to enable IP data packets to be transmitted therethrough to the protected network.

In particular, the means for temporarily opening the firewall include two IC-breakers, IC-breaker 1 and IC-breaker 2, located on opposite sides of said firewall, that the functional arrangements for the firewall is such that it allows IP-traffic to be transmitted from the inside thereof to the outside thereof, and communication to be effected between the two IC-breakers using a Ping service, and that a response to the Ping service temporarily opens the firewall for the transmission of IP data packets to the protected network. The IC-breaker functions are shown in the following table:

| Arriving IP data packet | Arriving Ping-packets |
| --- | --- |
| Send a number of Ping-packets to an IC-breaker inside the firewall; the packet size being indicative of the type of packet which has been received and the port via which it was received. | Identify the packet size of the Ping-packets which indicates the type of IP-packets, associated with the Ping-packets, and a particular port via which it was received. |
| Await receipt of an IP-packet from an IC-breaker which pings, i.e. responds to the Ping-packets. The received IP-packet causing the firewall for a short period of time and thereby allow an IP data packet to pass through the firewall, from the outside to the inside. | Send to the IC-breaker, outside the firewall, a packet of the type which has been identified. This will cause the firewall to open for a short period of time. |
| Send the original IP data packet | Await receipt of an IP data |

-continued

| Arriving IP data packet | Arriving Ping-packets |
|---|---|
| through the opened firewall to the IC-breaker inside the firewall for onward transmission to the intended recipient at a predetermined address. | packet from the IC-breaker outside the firewall and, on receipt, send the IP data packet to a predetermined address, for example, a remote computer system. |

It will also be seen from the foregoing description that the present invention provides a transmission system, for example, an ATM transmission system, which is adapted for the transmission of IP data packets, and which includes an IP-network, a network protected by a firewall, and means for gaining access to a firewall protected network.

The invention claimed is:

1. A transmission system configured to transmit IP data packets, comprising:
   an IP network;
   a protected network protected by a firewall configured to block incoming traffic to the protected network;
   a first IC-breaker; and
   a second IC-breaker; wherein
   said first and second IC breakers are configured to open the firewall to allow the IP data packets to be transferred through the firewall to the protected network;
   said first IC-breaker is located on a IP network side of the firewall and the second IC-breaker is located on a protected network side of the firewall, and said firewall is transparent to a particular type IP data packet, configured to communicate between said first and second IC-breakers through the firewall by using said particular type IP data packet;
   said first IC-breaker is configured to receive the IP data packets from the IP network, the IP data packets intended for the protected network, and said first IC-breaker is configured to send the particular type IP data packet to said second IC-breaker after reception of the particular type IP data packet; and
   said first IC-breaker is further configured to open the firewall for a time period at reception of a returned particular IP data packet from the second IC-breaker, and said returned particular IP data packet is sent before the firewall opens through the firewall to the second IC-breaker, and the second IC-breaker is configured to send the particular type IP data packet to the protected network after receiving the particular type IP data packet; and
   said particular IP data packet is a ping-packet,
   wherein said second IC-breaker is configured to identify a size of the ping-packet received from a sender in a form of an IC-breaker, said size being indicative of a type of packet which has been received and a port via which it was received.

2. The transmission system according to claim 1, wherein said firewall is configured to be transparent to IP-communication through the firewall from a protected network side to an IP network side thereof, and, during the time period, open to IP-communication through the firewall from the IP network side to the protected network side thereof.

3. The transmission system according to claim 1, wherein said first IC-breaker is configured, on receipt of an IP data packet, to store said particular type IP data packet and to send said stored IP data packet through the firewall to the second IC-breaker, when the firewall has been opened.

4. The transmission system according to claim 1, wherein said protected network is a Local Area Network.

5. A transmission system, as claimed in claim 1, wherein said system is an Asynchronous Transfer Mode ATM transmission system, configured to transmit IP data packets, using ATM as a carrier network.

6. A method for using a transmission system transmitting IP data packets from an IP-network to a protected network protected by firewall, said method comprising:
   receiving and storing an IP data packet by a first IC-breaker located on an IP-network side of the firewall;
   transmitting the IP data packet by said first IC-breaker to a second IC-breaker located on a protected network side of the firewall through the firewall, on receipt of a particular type IP data packet;
   opening the firewall by said particular type IP data packet for a period of time while awaiting receipt of said particular type IP data packet from said second IC-breaker;
   sending said stored IP data packet through the open firewall to said second IC-breaker; and
   identifying by said second IC-breaker a size of the particular type IP data packet received from said first IC-breaker, said size being indicative of a type of IP data packets which have been received and a port via which the data packet was received; wherein
   said particular type IP data packet is a ping-packet.

7. The method according to claim 6, further comprising:
   returning the particular type IP data packet from said second IC-breaker to said first IC-breaker, thereby opening the firewall for the period of time;
   awaiting reception, by said second IC-breaker, of said IP data packet for the protected network sent from said first IC-breaker, during said period of time the firewall is open; and
   sending the received IP data packet to the protected network by said second IC-breaker.

8. The method according to claim 6, wherein said protected network is a Local Area Network.

9. The method according to claim 6, wherein said transmission system is an Asynchronous Transfer Mode ATM transmission system, configured to transmit IP data packets, using ATM as a carrier network.

10. An apparatus configured to provide access to a firewall protected network, comprising:
    means for opening the firewall to enable IP data packets to be transmitted through the firewall to said protected network, wherein said means for opening the firewall includes a first and second IC-breaker located on opposite sides of said firewall, and wherein
    said firewall is configured to allow IP-traffic from a protected side thereof to another side, and communication between said first and second IC-breakers using a Ping service, a response to said Ping service opening the firewall for transmission of IP data packets to said protected network;
    wherein said second IC-breaker is configured to identify a size of a ping-packet used by the Ping service received from a sender in a form of an IC-breaker, said size being indicative of a type of packet which has been received and a port via which it was received.

11. The apparatus according to claim 10, wherein the first IC-breaker, located on an IP-network side of said firewall, is configured to:
    store IP data packets destined for the protected network;
    send ping-packets to the second IC-breaker through the firewall;

await receipt of a returned ping-packet from the second IC-breaker, said returned ping-packet opening the firewall for a period of time; and send said stored IP data packets through the open firewall to said second IC-breaker.

12. The apparatus according to claim 10, wherein the first IC breaker is located on an IP-network side of the firewall and that the second IC-breaker is located on the protected network side of the firewall, wherein said first IC-breaker is configured to receive and store IP data packets destined for the protected network, wherein said first and second IC breakers are configured, on receipt, by said first IC-breaker, of a IP data packet for the protected network, to communicate with each other, through the firewall, using ping-packets, one of said ping-packets returned by said second IC-breaker to said first IC-breaker opening the firewall for this type of traffic, and wherein said first IC-breaker is configured, on receipt of the returned ping-packet, to send IP data packets through the opened firewall to the second IC-breaker, and wherein said second IC-breaker is adapted, on receipt of said IP data packet, to send the received packets to the protected network.

13. The apparatus as claimed in claim 10, wherein said IC-breaker includes:
means for transmitting ping-packets to at least one of the first or second IC-breaker, located behind a firewall;
means for storing received IP data packets;
means for detecting receipt of said IP data packets from within said firewall; and
means, operative in response to receipt of IP data packets, to transmit stored IP data packets.

14. The apparatus as claimed in claim 10, wherein said IC-breaker includes:
means for identifying a received ping-packet and determining an associated IP data packet type thereto;
means for transmitting IP data packets of said associated IP data packet type through the firewall;
means for receiving the IP data packets transmitted through said firewall; and
means for distributing at least one of said IP data packets to a predetermined address.

15. A transmission system configured to transmit IP data packets, said system including:
an IP-network protected by a firewall;
means for opening the firewall to enable IP data packets to be transmitted through the firewall to said protected network, wherein said means for opening the firewall includes a first and second IC-breaker located on opposite sides of said firewall, and wherein
said firewall is configured to allow IP-traffic from a protected side thereof to another side, and communication between said first and second IC-breakers using a Ping service, a response to said Ping service opening the firewall for transmission of IP data packets to said protected network;
wherein said second IC-breaker is configured to identify a size of a ping-packet used by the Ping service received from a sender in a form of an IC-breaker, said size being indicative of a type of packet which has been received and a port via which it was received.

16. A transmission system configured to transmit IP data packets, said system comprising:
an IP network;
a protected network protected by a firewall configured to block incoming traffic to the protected network;
a first IC-breaker; and
a second IC-breaker; wherein said first and second IC breakers are configured to open the firewall to allow the IP data packets to be transferred through the firewall to the protected network; wherein said first IC-breaker is located on a IP network side of the firewall and the second IC-breaker is located on a protected network side of the firewall, and said firewall is transparent to a particular type IP data packet, configured to communicate between said first and second IC-breakers through the firewall by using said particular type IP data packet;

said first IC-breaker is configured to receive the IP data packets from the IP network, the IP data packets are intended for the protected network, and said first IC-breaker is configured to send the particular type IP data packet to said second IC-breaker after reception of the particular type IP data packet;

said first IC-breaker is further configured to open the firewall for a time period at reception of a returned particular IP data packet from the second IC-breaker, and said returned particular IP data packet sent before the firewall opens through the firewall to the second IC-breaker, and the second IC-breaker is configured to send the particular type IP data packet to the protected network after receiving the particular type IP data packet; and said second IC-breaker is configured to identify a size of the particular type IP data packet received from a sender in a form of an IC-breaker, said size is indicative of a type of packet which has been received and a port via which the particular type IP data packet was received.

17. A method for using a transmission system transmitting IP data packets from an IP-network to a protected network protected by firewall, said method comprising:
receiving and storing an IP data packet by a first IC-breaker located on an IP-network side of the firewall;
transmitting the IP data packet by said first IC-breaker to a second IC-breaker located on a protected network side of the firewall through the firewall, on receipt of a particular type IP data packet;
opening the firewall by said particular type IP data packet for a period of time while awaiting receipt of said particular type IP data packet from said second IC-breaker;
sending said stored IP data packet through the open firewall to said second IC-breaker;
identifying by said second IC-breaker a size of the particular type IP data packet received from said first IC-breaker, said size being indicative of a type of IP data packets which have been received and a port via which the data packet was received;
returning the particular type IP data packet from said second IC-breaker to said first IC-breaker, thereby opening the firewall for the period of time;
awaiting reception, by said second IC-breaker, of said IP data packet for the protected network sent from said first IC-breaker, during said period of time the firewall is open; and
sending the received IP data packet to the protected network by said second IC-breaker.

18. Apparatus for providing access to a firewall protected network, comprising:
means for opening a firewall to enable IP data packets to be transmitted through the firewall to said protected network, wherein said means for opening the firewall includes a first and second IC-breaker located on opposite sides of said firewall;

wherein said firewall is configured to allow IP-traffic from a protected side thereof to another side, and communication between said first and second IC-breakers use a ping service, a response to said ping service opening the firewall for transmission of IP data packets to said protected network;

wherein the second IC-breaker, located on the protected network side of the firewall is configured to:

identify a size of a ping-packet received from the first IC-breaker, said size being indicative of the type of packet which has been received and a port via which the ping-packet was received;

return the ping-packet to the first IC-breaker, which opens the firewall for a period of time;

await receipt, from the first IC-breaker, of said IP data packet for the protected network during said period of time said firewall is open; and send the received IP data packets to the protected network.

19. A transmission system according to claim 1, wherein said period of time is at least a duration of a transmission of the IP data packets through the firewall by said first or second IC breaker.

20. A transmission system according to claim 6, wherein said period of time is at least a duration of a transmission of the IP data packets through the firewall by said first or second IC breaker.

21. An apparatus for providing access to a firewall protected network according to claim 11, wherein said period of time is at least a duration of a transmission of the IP data packets through the firewall by said first or second IC breaker.

22. A transmission system according to claim 1, wherein said ping-packet is an internet control message protocol packet ICMP.

23. A transmission system according to claim 6, wherein said ping-packet is an internet control message protocol packet ICMP.

* * * * *